Patented Apr. 21, 1931

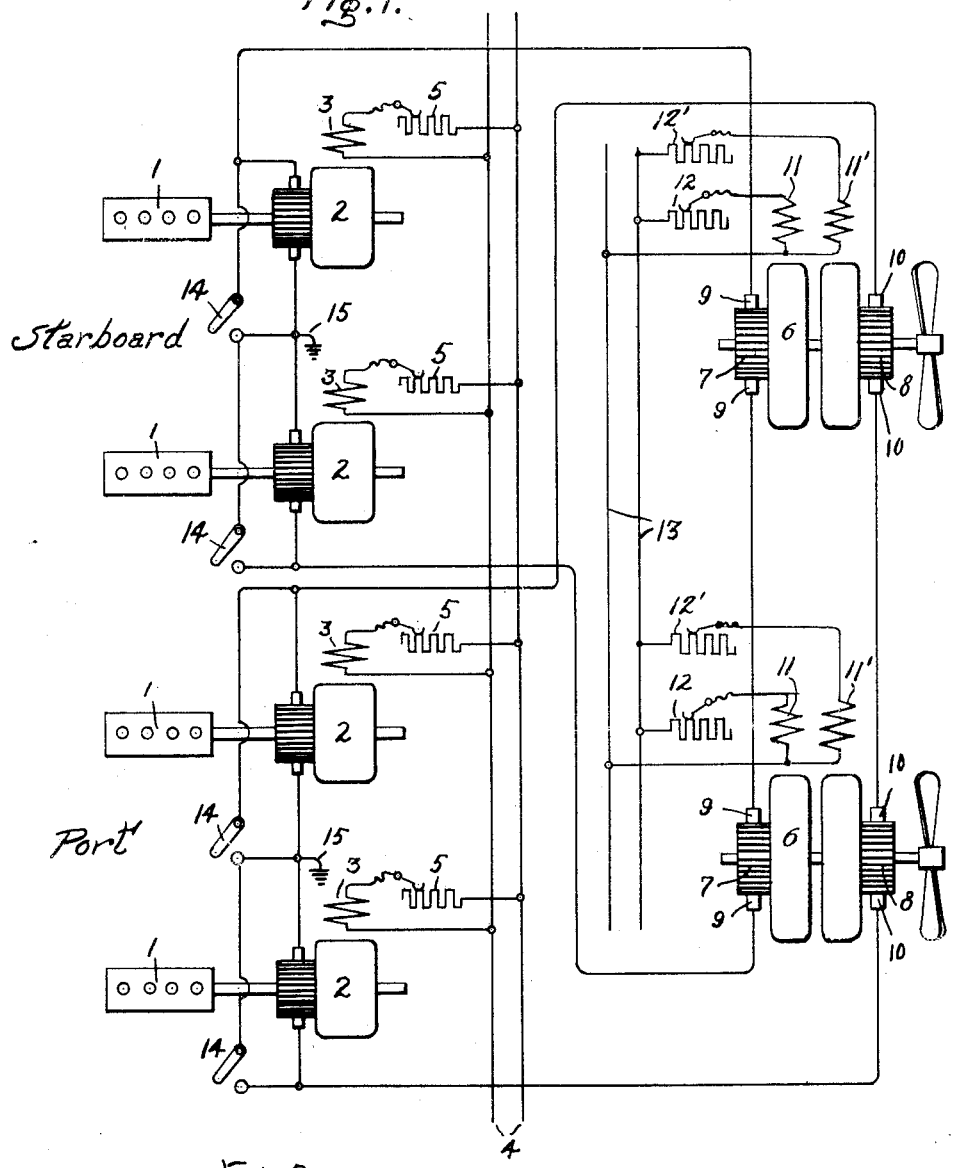
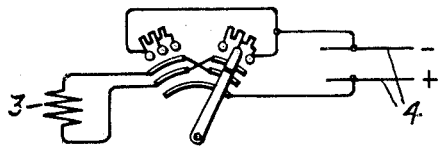

1,802,184

UNITED STATES PATENT OFFICE

ALAN ADAIR POLLOCK, OF LEAMINGTON SPA, ENGLAND, ASSIGNOR TO GENERAL ELECTRIC COMPANY, A CORPORATION OF NEW YORK

PROPULSION OF MULTIPLE-SCREW SHIPS

Application filed July 17, 1923, Serial No. 652,193, and in Great Britain November 1, 1922.

My invention relates to the propulsion of multiple-screw ships, and especially to systems of electric ship propulsion wherein a plurality of generators driven by separate prime movers are arranged to supply current to the propeller motors.

In the case of large multiple-screw ships it is desirable to subdivide the generating equipment into sections or groups and to ground the midpoint of each section in order to maintain the voltage to ground within safe limits. In prior installations of this character it has been customary to connect each group of generators in series with one propeller motor. With this arrangement the breakdown of an engine in one generating group necessitates the closing down of a corresponding engine in the other group or groups so as to equalize the torques on the different propellers.

An object of my invention is to provide means for maintaining equal torques on all the propellers regardless of the number of engines in operation.

In one form of my invention propeller motors of the double-armature type are utilized, and one group of generators is connected in series with one armature of each motor. Thus, if four generating sets are provided for driving two propellers, the two port engines will supply half the required current and the other half will be supplied by the two starboard engines. Under these conditions, if one of the engines breaks down, the torques exerted by the propeller motors will be changed by equal amounts and will therefore be maintained at equal values.

My invention will be better understood from the following description considered in connection with the accompanying drawing and its scope will be pointed out by the appended claims.

Referring now to the drawing, Fig. 1 shows a system in which my invention has been embodied, and Fig. 2 shows a reversing rheostat which may be used to regulate the direction of rotation and speed of the propeller motors through control of the generator fields.

Fig. 1 shows a plurality of Diesel engines or other suitable prime movers 1, each arranged to drive a direct current generator 2 provided with a field winding 3 arranged to be supplied with current from a suitable source 4 through a rheostat 5 which may be of the reversing type shown in Fig. 2 in order to permit operation of the propeller motors in either direction. Each propeller motor 6 is provided with armatures having commutators 7 and 8 constructed to cooperate with brushes 9 and 10 respectively, and is also provided with field windings 11, 11' connected through variable resistors 12, 12' to a suitable source of current 13. In order to maintain equal torques on the "starboard" and "port" propellers, the "port" group of generators is connected in series with the commutators 8 and the "starboard" group is connected in series with the commutators 7.

If now, by way of example, there is a failure of an engine or generator of the "port" group, the voltage across the commutators 8 will be reduced to the voltage of one generator in the system shown, and, in order to enable the corresponding armatures of the double armature motor 6 to contribute their share of the propeller torque, the fields 11' are weakened to such a point that the current supplied by the remaining "port" generator is the full load current. Thus, the motors running with only three generators supplying the current will be capable of exerting three-fourths of the full load torque and the torques and speeds of the two propellers may be maintained equal.

Switches 14 may be provided for short circuiting each of the generators 2 when it is idle. The circuit interconnecting each group of generators is grounded at a point 15 in order to limit the voltage to ground to a safe value. For the purpose of producing a difference in the speeds of the motors 6, as in turning the ship for example, the motor field rheostats 12, 12' may be manipulated to alter the relation between the field intensities of the different motors.

While I have described only one embodiment of my invention, I do not wish to be limited to the particular form shown and described as it will be apparent to those skilled in the art that many modifications therein may be made without departing from the scope of my invention as set forth in the appended claims.

What I claim as new and desire to secure by Letters Patent of the United States, is,—

1. A ship propulsion system comprising starboard and port propellers, a group of motors for driving the starboard propeller, a second group of motors for driving the port propeller, a plurality of groups of independently driven generators, means for connecting at all times the generators of each of said groups to a motor of the starboard motor group and to a motor of the port motor group, and means for disconnecting a disabled generator from its group.

2. A system of electric ship propulsion comprising starboard and port propellers, a plurality of direct current generators arranged in groups, and propeller motors for said starboard and port propellers each provided with a plurality of armatures, an armature of each starboard and port motor being conductively related at all times to one of said generator groups.

3. A system of electric ship propulsion for twin screw ships comprising a plurality of direct current generators arranged in two groups, a separate prime mover for driving each generator, and port and starboard propeller motors each provided with one armature cooperatively associated at all times with one of said generator groups and another armature cooperatively associated at all times with the other of said groups.

4. A system of electric ship propulsion for multiple screw ships having port and starboard propellers comprising a plurality of independently driven generators connected in groups, a plurality of motor groups respectively connected to port and starboard propellers, and means for connecting at all times a motor of each motor group to each of said generator groups.

In witness whereof, I have hereunto set my hand this twenty-sixth day of June, 1923.

ALAN ADAIR POLLOCK.